United States Patent
Kim et al.

(10) Patent No.: US 9,195,881 B2
(45) Date of Patent: Nov. 24, 2015

(54) IMAGE TRANSFORMATION APPARATUS AND METHOD

(71) Applicant: SAMSUNG ELECTRONICS CO., LTD., Suwon-si (KR)

(72) Inventors: Do-wan Kim, Suwon-si (KR); Alexander Limonov, Suwon-si (KR); Jin-sung Lee, Suwon-si (KR); Kil-soo Jung, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 14/024,113

(22) Filed: Sep. 11, 2013

(65) Prior Publication Data

US 2014/0185939 A1 Jul. 3, 2014

(30) Foreign Application Priority Data

Dec. 28, 2012 (KR) ........................ 10-2012-0156999

(51) Int. Cl.
*G06K 9/42* (2006.01)
*G06K 9/00* (2006.01)
*G06T 3/00* (2006.01)

(52) U.S. Cl.
CPC .......... *G06K 9/00281* (2013.01); *G06T 3/0006* (2013.01); *G06T 3/0093* (2013.01)

(58) Field of Classification Search
None
See application file for complete search history.

(56) References Cited

U.S. PATENT DOCUMENTS

| 5,905,807 A | 5/1999 | Kado et al. |
| 7,751,599 B2 | 7/2010 | Chen et al. |
| 2007/0223827 A1 | 9/2007 | Nishimori et al. |
| 2007/0252674 A1 | 11/2007 | Nelson et al. |
| 2008/0165187 A1* | 7/2008 | Marugame .................... 345/420 |
| 2008/0174795 A1 | 7/2008 | Andres Del Valle |
| 2010/0183228 A1 | 7/2010 | Matsuzaka et al. |

FOREIGN PATENT DOCUMENTS

| JP | 2007-34724 A | 2/2007 |
| KR | 10-2006-0104027 A | 10/2006 |
| KR | 10-2007-0097794 A | 10/2007 |
| KR | 10-2009-0000635 A | 1/2009 |
| KR | 10-2012-0070985 A | 7/2012 |

OTHER PUBLICATIONS

Machine translation of JP 2007-034724, Detailed Description only, published on Aug. 2, 2007, 14 pages total.*
Communication dated Dec. 19, 2013 issued by the International Searching Authority in counterpart Application No. PCT/KR2013/006878 (PCT/ISA/210).
Communication dated Dec. 19, 2013 issued by the International Searching Authority in counterpart Application No. PCT/KR2013/006878 (PCT/ISA/237).

* cited by examiner

*Primary Examiner* — Brian P Werner
(74) *Attorney, Agent, or Firm* — Sughrue Mion, PLLC

(57) ABSTRACT

An image transformation apparatus includes a detection unit which is configured to detect, from each of a user image and a reference image, feature points of a face and angle information of the face, a feature points adjusting unit which is configured to adjust the feature points of the user image or the reference image by using the detected angle information, a face analysis unit which is configured to compare facial features contained in the user image and the reference image by using the adjusted feature points, and an image transformation unit which is configured to transform the user image by using a result of the comparison of the facial features from the face analysis unit.

15 Claims, 6 Drawing Sheets

IMAGE TRANSFORMATION APPARATUS AND METHOD

CROSS-REFERENCE TO RELATED APPLICATION

This application claims priority from Korean Patent Application No. 10-2012-0156999 filed Dec. 28, 2012 in the Korean Intellectual Property Office, the disclosure of which is incorporated herein by reference in its entirety.

BACKGROUND

1. Field

Apparatuses and methods consistent with exemplary embodiments relate to image transformation, and more particularly, transforming user images.

2. Description of the Related Art

Recently, communities through the Internet such as a social network service (SNS), etc. are a rapidly developing trend. Frequently, when a user uploads pictures to the SNS, they transform the uploaded images so that they look prettier.

Related art image transformation methods require a user to perform many operations, such as directly inputting the image for transformation or transforming each facial region. General users who are not familiar with the image transformations, however, may have difficulty in determining the points to be transformed and the degree of the transformation. Accordingly, a way in which users can more easily transform images is required.

SUMMARY

Exemplary embodiments overcome the above disadvantages and other disadvantages not described above. However, an exemplary embodiment of the present invention may not overcome any of the problems described above.

One or more exemplary embodiments provide an image transformation apparatus and method to use a reference image in order to allow general users who are not familiar with image transformation to easily perform the image transformation.

According to an aspect of an exemplary embodiment, there is provided an image transformation apparatus including: a detection unit which is configured to detect, from each of a user image and a reference image, feature points of a face and angle information of the face; a feature points adjusting unit which is configured to adjust the feature points of the user image or the reference image by using the detected angle information; a face analysis unit which is configured to compare facial features contained in the user image and the reference image by using the adjusted feature points; and an image transformation unit which is configured to transform the user image by using a result of the comparison of the facial features by the face analysis unit.

The feature points adjusting unit may adjust the feature points of the user image or the reference image so that a face angle of each of the user image and the reference image is matched with each other.

The face analysis unit may compare the facial features by calculating and comparing a difference in distances between the feature points of the user image and the feature points of the reference image, and the image transformation unit may transform the feature points of the user image based on the calculated difference of relative distances.

The facial features may include at least one of an eye shape, a nose shape, a mouth shape, and a jaw-line shape.

The image transformation apparatus may include an image recommendation unit which is configured to recommend at least one reference image based on user information; and an input unit which is configured to receive a user's command to select at least one of the recommended reference images.

The user information may include at least one of a user's gender, age, schedule, image transformation intentions, and current location, and user image analysis results.

Each of the user image and the reference image may be a two-dimensional (2D) image.

According to an aspect of another exemplary embodiment, there is provided an image transformation method including: detecting, from each of a user image and a reference image, feature points of a face and angle information of the face; adjusting the feature points of the user image or the reference image by using the detected angle information; comparing facial features contained in the user image and the reference image by using the adjusted feature points; and transforming the user image by using a result of the comparing the facial features.

The adjusting the feature points may include adjusting the feature points of the user image or the reference image so that a face angle of each of the user image and the reference image is matched with each other.

The comparing facial features may include calculating and comparing a difference in distances between the feature points of the user image and the feature points of the reference image, and the transforming the user image may include transforming the feature points of the user image based on the calculated difference of relative distances.

The facial features may include at least one of an eye shape, a nose shape, a mouth shape, and a jaw-line shape.

The image transformation method may include recommending at least one reference image based on user information; and receiving a user's command to select at least one of the recommended reference images.

The user information includes at least one of a user's gender, age, schedule, image transformation intentions, and current location, and user image analysis results.

Each of the user image and the reference image may be a 2D image.

According to an aspect of yet another exemplary embodiment, there is provided a device including: a processor which is configured to detect feature points of a face from an image, to compare facial features contained in different images using feature points detected in the different images, and using the comparison of the facial features in the different images, to transform the facial features of one the different images.

Each of the different images may include facial features from a plurality of facial regions including a first region and a second region, and the processor is configured to transform a facial feature in the first region of the one of the different images differently than a facial feature in the second region of the one of the different images.

The processor may be further configured to, using the comparison of the facial features contained in the different images, determine whether a difference in the facial features contained in the different images exceeds a predetermined threshold, in response to determining that the difference in the facial features does exceed the predetermined threshold, the processor transforms the one of the different images using a first value, and in response to determining that the difference in the facial features does not exceed the predetermined threshold, the processor transforms the one of the different images using a second value that is different than the first value.

The processor may be further configured to, using the feature points of the respective faces from the different images, standardize a face angle of the respective faces so that the face angle of the respective faces in the different images is substantially equal.

BRIEF DESCRIPTION OF THE DRAWINGS

The and/or other aspects will become apparent and more readily appreciated from the following description of exemplary embodiments, taken in conjunction with the accompanying drawings of which.

DETAILED DESCRIPTION OF EXEMPLARY EMBODIMENTS

Figure 1:
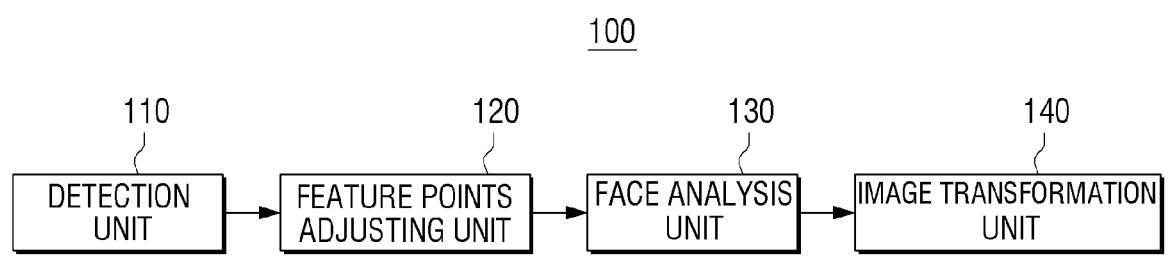
FIG. 1 is a view illustrating configuration of an image transformation apparatus according to an exemplary embodiment.

Hereinafter, certain exemplary embodiments will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Throughout the drawings, like reference numerals will be understood to refer to like parts, components and structures. Further, dimensions of various elements in the accompanying drawings may be arbitrarily increased or decreased for assisting in a comprehensive understanding.

As used herein, the term "unit" means a hardware component, such as a processor or circuit, and/or a software component that is executed by a hardware component such as a processor.

FIG. 1 is a view illustrating configuration of an image transformation apparatus according to an exemplary embodiment. Referring to FIG. 1, an image transformation apparatus 100 includes a detection unit 110, a feature points adjusting unit 120, a face analysis unit 130, and an image transformation unit 140. The image transformation apparatus may be implemented as a variety of apparatuses such as a smart phone, a camera, a television (TV), a notebook computer, a tablet computer, an electronic book, an electronic frame, a kiosk, etc.

The detection unit 110 detects feature points of a face area and angle information of a face from a user image and a reference image. Here, both the user image and the reference image include the face area, the user image is an image including a face to be transformed, and the reference image is an image to be referred when the face of the user image is transformed. The user image and the reference image may each be a two-dimensional (2D) image or a three-dimensional (3D) image. It is desirable that the user image and the reference image are each a 2D image.

Figure 2:
FIG. 2 is a view illustrating feature points detection results according to an exemplary embodiment.

FIG. 2 is a view illustrating feature points detection results according to an exemplary embodiment. As illustrated in FIG. 2, the detection unit 110 may detect feature points of the face area depending on a pre-learning algorithm. Particularly, the detection unit 110 pre-learns face patterns by using an active appearance model (AAM) technique, etc., and thus can automatically detect positions of the feature points. Also, the detection unit 110 may detect a face angle based on a head rotation angle by using the detected positions of the feature points. Hereinafter, a process of detecting face angle information will be described in detail.

The detection unit 110 may obtain a left side area and a right side area of the face by using the positions of the feature points. At this time, the detection unit 110 may obtain the left side area and the right side area of the face by using the positions of the representative feature points such as a position of the feature point which locates in a middle between the eyebrows, positions of the feature points representing the contours of the face, a position of the feature point corresponding to the tip of a nose, and positions of the feature points located around a lip.

In detail, the detection unit 110 may create triangles based on the positions of the representative feature points, and thus calculate the sum of areas of the triangles so as to obtain the left side area and right side area of the face. After that, the detection unit 110 may detect the face angle information from the ratio of the left side area and the right side area of the face. It is assumed that if the user's head is rotated to the right side, the head rotation angle has a positive value, and if the user's head is rotated to the left side, the head rotation angle has a negative value. At this time, when the user's head is rotated to the right side, a range of the head rotation angle $\theta$ is assumed to be $0° \leq \theta \leq 45°$. At this time, the left side area (LHP) of the face is represented by Formula 1, and the right side area (RHP) of the face is represented by Formula 2.

$$LHP = w_1 h_1 + \frac{\pi}{4} w_2 h_2 = (r\cos\theta + r\sin\theta)h_1 + \frac{\pi}{4}(r\cos\theta + r\sin\theta)h_2 \quad \langle\text{Formula 1}\rangle$$

$$RHP = w_2 h_1 + \frac{\pi}{4} w_2 h_2 = (r - r\sin\theta)h_1 + \frac{\pi}{4}(r - \sin\theta)h_2 \quad \langle\text{Formula 2}\rangle$$

Here, $\theta$ is the head rotation angle, $w_1$ is a width of the left side of the face, $w_2$ is a width of the right side of the face, $h_1$ is a length corresponding to cheeks of the face, $h_2$ is a length corresponding to a chin of the face, and r is a distance from the center of the head to the outline of the head.

Accordingly, the ratio of the left side area and the right side area of the face may be determined according to Formula 3, and the head rotation angle may be estimated according to Formula 4.

$$\frac{RHP}{LHP} = \frac{1 - \sin\theta}{\cos\theta + \sin\theta} = \rho \leq 1 \quad \langle\text{Formula 3}\rangle$$

$$\theta = \sin^{-1}\left(\frac{1}{\sqrt{(\rho+1)^2 + \rho^2}}\right) - \tan^{-1}\left(\frac{\rho}{\rho+1}\right) \quad \langle\text{Formula 4}\rangle$$

On the contrary, when the user's head is rotated to the left side, a range of the head rotation angle $\theta$ is assumed to be $-45° \leq \theta \leq 0°$. At this time, the left side area (LHP) of the face may be represented by Formula 5, and the right side area (RHP) of the face may be represented by Formula 6.

$$LHP = w_1 h_1 + \frac{\pi}{4} w_1 h_2 = (r + r\sin\theta)h_1 + \frac{\pi}{4}(r + r\sin\theta)h_2 \quad \langle \text{Formula 5}\rangle$$

$$RHP = \quad \langle \text{Formula 6}\rangle$$
$$w_2 h_1 + \frac{\pi}{4} w_2 h_2 = (r\cos\theta - r\sin\theta)h_1 + \frac{\pi}{4}(r\cos\theta - r\sin\theta)h_2$$

Here, $\theta$ is the head rotation angle, $w_1$ is a width of the left side of the face, $w_2$ is a width of the right side of the face, $h_1$ is a length corresponding to cheeks of the face, $h_2$ is a length corresponding to a chin of the face, and r is a distance from the center of the head to the outline of the head.

Accordingly, the ratio of the left side area and the right side area of the face may be determined according to Formula 7, and the head rotation angle may be estimated according to Formula 8.

$$\frac{RHP}{LHP} = \frac{\cos\theta - \sin\theta}{1 + \sin\theta} = \rho > 1 \quad \langle \text{Formula 7}\rangle$$

$$\theta = \cos^{-1}\left(\frac{\rho}{\sqrt{(\rho+1)^2 + 1^2}}\right) - \tan^{-1}(\rho + 1) \quad \langle \text{Formula 8}\rangle$$

The detection unit 110 may detect the face angle information in yaw, pitch, and roll directions through such a way. The angle information in the yaw, pitch, and roll directions may correspond to rotation angles with respect to x, y, and z axis.

The feature points adjusting unit 120 adjusts the feature points of the user image or the reference image by using the angle information detected by the detection unit 110. In detail, if the angle information detected from the user image is different from the angle information of the face detected from the reference image, the feature points adjusting unit 120 may adjust the feature points of the user image or the reference image so that the face angles are matched to each other. Particularly, since image transformation is performed for the user image, the face angle of the reference image may be adjusted to match with the user image without changing the face angle of the user image. However, the face angle of the user image may be adjusted to match with the face angle of the reference image. Alternatively, both the user image and reference image may be adjusted so that the face angle of each of the user image and the reference image faces the front side thereof.

On the other hand, if there is a difference in the sizes of the faces contained in the user image and the reference image, the feature points adjusting unit 120 may perform scaling for the user image or the reference image to match the size thereof.

The face analysis unit 130 compares facial features contained in the user image and the reference image by using the adjusted feature points. Here, the facial features refer to shapes of important components of the face such as eyes, nose, mouth, jaw line, face ratio, etc. In detail, the face analysis unit 130 may calculate the difference therebetween by comparing relative distances between feature points contained in the user image and relative distances between the feature points contained in the reference image. Particularly, relative distances between feature points corresponding to the facial features may be compared. The face analysis unit 130 will be described in more detail with reference to FIG. 3.

Figure 3:
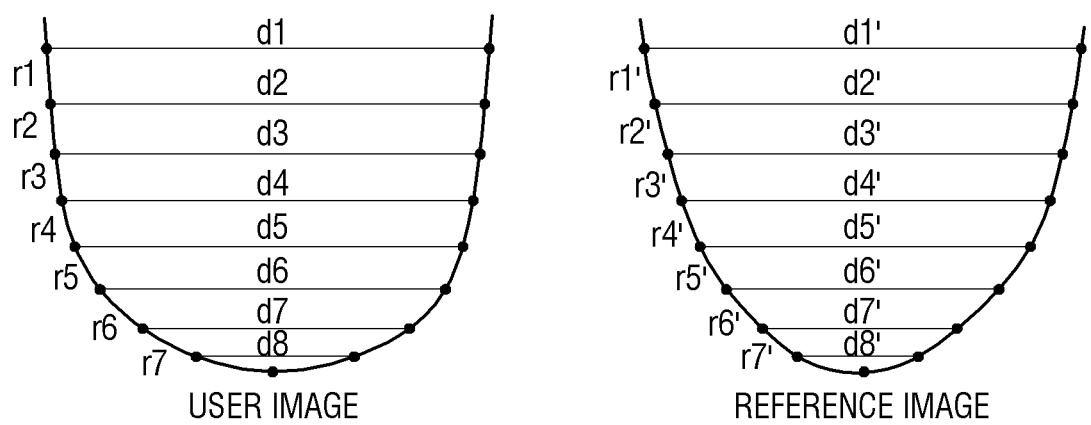
FIG. 3 is a view for explaining a detailed operation of a face analysis unit according to an exemplary embodiment.

FIG. 3 is a view for explaining a detailed operation of a face analysis unit 130 according to an exemplary embodiment.

Particularly, FIG. 3 is a view for explaining an operation to compare jaw lines of the user image and reference image. As illustrated in FIG. 3, the face analysis unit 130 may calculate distances between feature points configuring the jaw line of the face of each of the user image and the reference image. At this time, the distances between all the feature points configuring the jaw line do not need to be calculated. Rather, only distances between some feature points used to determine the facial characteristics are calculated. Referring to FIG. 3, distances of r1 to r7 and d1 to d8 are calculated from the feature points configuring the jaw line of the face of the user image, and distances of r1' to r7' and d1' to d8' are calculated from the feature points configuring the jaw line of the face of the reference image. However, the calculated distances are not limited by and the distances between various feature points may be calculated as needed.

After that, the face analysis unit 130 analyzes differences in the distances between the feature points corresponding to each other in the user image and the reference image based on the calculated distances between the feature points. For example, corresponding distances between the feature points such as r1 and r1', r2 and r2', d1 and d2, etc. as illustrated in FIG. 3 may be compared.

Although the above description and FIG. 3, merely describe a process for comparing the jaw line, the other facial features may be compared in the same way. Particularly, facial features such as eyes, nose, mouth, etc. may be compared. In addition, the face analysis unit 130 may compare the ratio of the horizontal length and the vertical length of the entire face, eyes, nose, mouth, etc.

By using the comparison results of the facial features from the face analysis unit 130, the image transformation unit 140 may transform the user image. Particularly, the image transformation unit 140 may transform the user image by transforming the feature points of the user image based on the differences in the distances between the feature points calculated in the face analysis unit 130. In a case where the user image and the reference image each have a same number of feature points, there may be one-to-one correspondence of the feature points.

There are various extents to which the user image may be set. The image transformation apparatus 100 may inquire what degree of transformation the user wants, and then may determine the degree of transformation based on a user input. Alternatively, the user image may automatically be transformed according to a predetermined ratio. This will be described in detail with reference to FIG. 4.

Figure 4:
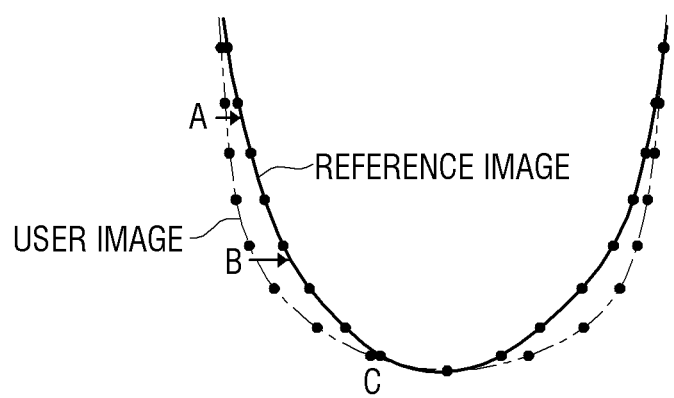
FIG. 4 is a view for explaining a face transformation process according to an exemplary embodiment.

FIG. 4 is a view for explaining a face transformation process according to an exemplary embodiment. Particularly, FIG. 4 is a view comparing a jaw line of the user image with that of the reference image. Based on the comparison results of the face analysis unit 130, the image transformation unit 140 may determine the difference between the jaw line of the user image and the jaw line of the reference image as illustrated in FIG. 4. Here, if the ratio is assumed to be 1 when the feature point of the user image is transformed to be the same as the corresponding feature point of the reference image, the feature points of the user image may be transformed depending on predetermined ratios such as 0.2, 0.5, 0.8, etc.

Also, the image transformation unit 140 may automatically determine to the extent to which the user image is transformed by using the distances, the ratios, etc. between the feature points compared by the face analysis unit 130. For example, if the difference between the user image and the reference image is not large as determined by a predetermined threshold, the user image may be transformed at a high ratio such as 0.5, 0.7, etc. If the difference between the user image and the reference image is large as determined by the predetermined threshold, the user image may be transformed at a low ratio such as 0.2, 0.3, etc. in order to prevent excessive transformation.

On the other hand, if all the feature points of the face are transformed at the same ratio, the transformation result may appear unnatural. At this time, the image transformation unit 140 may set a different transformation ratio for the various regions of the face based on the distance, ratio, etc. between the feature points in a certain region. For example, if portions A, B, and C are compared in FIG. 4, the differences between the portions of the user image and the reference image are B>A>C. Thus, the transformation ratio may be set differently for each of the portions A, B, and C. For example, B may be set to have a ratio of 0.5, A may be set to have a ratio of 0.3, and C may be set to have a ratio of 0.2. Also, the image transformation unit 140 may determine the ratio by considering the ratio of the horizontal and vertical of the face so that the face is more naturally seen.

Figure 5:
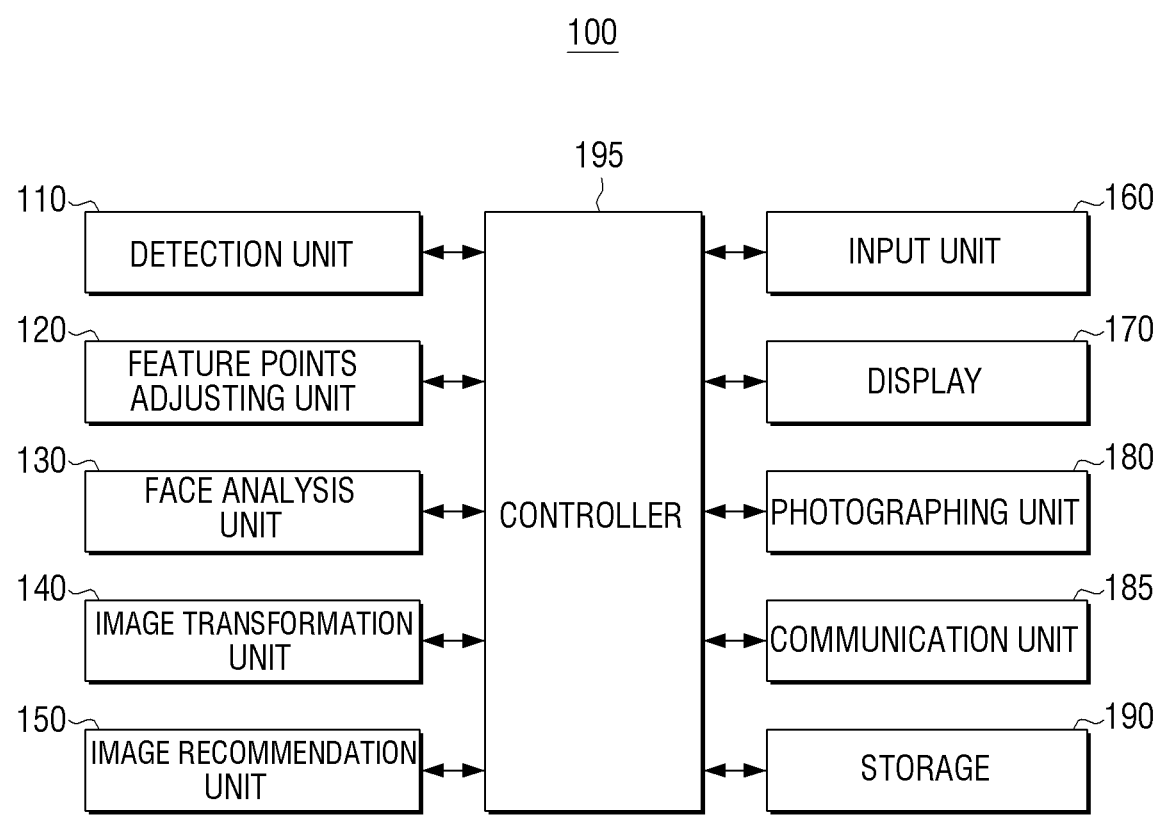
FIG. 5 is a block diagram illustrating configuration of an image transformation apparatus according to another exemplary embodiment.

FIG. 5 is a block diagram illustrating a configuration of an image transformation apparatus according to another exemplary embodiment. Referring to FIG. 5, the image transformation apparatus 100 may include an image recommendation unit 150, an input unit 160, a display 170, a camera 180, a communication unit 185, a storage 190, and a controller 195 as well as the detection unit 110, the feature points adjusting unit 120, the face analysis unit 130, and the image transformation unit 140.

The image recommendation unit 150 may recommend the reference image based on user information, which may include things such as at least one of a user's gender and age, a user image analysis results, a user's schedule, a user's image transformation intentions, a user's current location, etc. The user's image transformation intentions refers to user's intentions for the image transformation, for example, whether to transform the user image to appear innocent or sexy. The image transformation apparatus 100 according to an exemplary embodiment uses the reference image in order to transform the user image. The user may select the user image and the reference image through the input unit 160. However, if the reference image to which the user wants to refer is not stored in the storage 190, the user may search for a reference image, thereby feeling inconvenient. Accordingly, the image transformation apparatus 100 may automatically search for and recommend the reference images by using a variety of user information.

The user's gender and age, and the user's image transformation intentions may be input through the input unit 160. Information for the user's schedule may be obtained from a schedule management application interlocked with the user's schedule. The user's current location may be obtained from a global positioning system (GPS) or WiFi contained in the image transformation apparatus 100. Then, the user image analysis results may be obtained from the detection unit 110.

The image recommendation unit 150 may recommend images stored in the storage 190 or images searched for in the internet, an external server, etc. as the reference image by using the above-described user information. On the other hand, information (for example, gender, age) for the reference image may be processed as an index, and thus stored in the storage 190 or the external server. Accordingly, the image recommendation unit 150 may search for images classified as having a similar age or gender as those of the user, and then, compare analysis results of the reference images with the user image analysis results, thereby recommending at least one reference image appropriate to the transformation. Also, if the user's image transformation intentions are input, the image recommendation unit 150 may recommend at least one reference image classified as being appropriate to a specific intention such as a sexy image, an intelligent image, an innocent image, etc. The user's schedule or current location may be used to recommend images appropriate to a particular place or a specific state. For example, if the user's schedule and current location are identified as study and school, the image recommendation unit 150 may recommend a reference image having an intelligent image.

The input unit 160 receives user's commands. Particularly, the input unit 160 may receive user's commands to select the user image and the reference image, and user information such as gender, age, etc. of the user. Also, if the reference images are recommended, the input unit 160 may receive a user's command to select at least one of the recommended reference images. On the other hand, the input unit 160 may be implemented as various types of input apparatuses such as a mouse, a keyboard, a touch pad, a touch screen, a motion sensor, etc.

The display 170 displays images. In detail, the display 170 may display a user image transformed by the image transformation unit 140. The display 170 may be implemented as various types of display panels such as a cathode ray tube (CRT), a liquid crystal display (LCD), a plasma display panel (PDP), an organic light emitting diode (OLED), etc.

The photographing unit 180 photographs the user image. In detail, the photographing unit 180 may photograph the user image including a face area of the user. In other words, the user of the image transformation apparatus 100 may select the images directly photographed by the photographing unit 180 as well as the images stored in the storage 190 as the user image. For this, the photographing unit 180 may be implemented as a camera. The photographing unit 180 may be embedded in the image transformation apparatus 100. Alternatively, the photographing unit 180 may be implemented as an external device connected wired or wirelessly to the image transformation apparatus 100.

The communication unit 185 communicates with the external apparatuses. Particularly, the communication unit 185 may receive the reference images from the internet or the external server, and may transmit transformed user images to the external apparatuses. The communication unit 185 may include a variety of communication modules such as a local area wireless communication module (not illustrated), a wireless communication module (not illustrated), a GPS module, etc. Here, the local area wireless communication module refers to a module that performs communication with the external devices located in the local area according to a local area wireless communication method such as Blu-tooth, Zig-Bee, etc. Also, the wireless communication module refers to a module to perform communication by being connected to an external network according to wireless communication protocols such as WiFi, IEEE, etc. In addition, the wireless communication module may include a mobile communication module to perform communication by being connected to mobile communication networks according to various mobile communication standards such as third generation (3G), third generation partnership project (3GPP), long term evolution (LTE), etc.

The storage 190 may store the user images, the reference images, and the transformed user images. Also, the storage 190 may store the user information, such as gender, age, etc., input by the user.

The controller 195 controls overall operations of the image transformation apparatus 100. In detail, the controller 195 may control each of the detection unit 110, the feature points adjusting unit 120, the face analysis unit 130, the image transformation unit 140, the image recommendation unit 150, the input unit 160, the display 170, the photographing unit 180, the communication unit 185, and the storage 190 to transform the user images.

Figure 6:
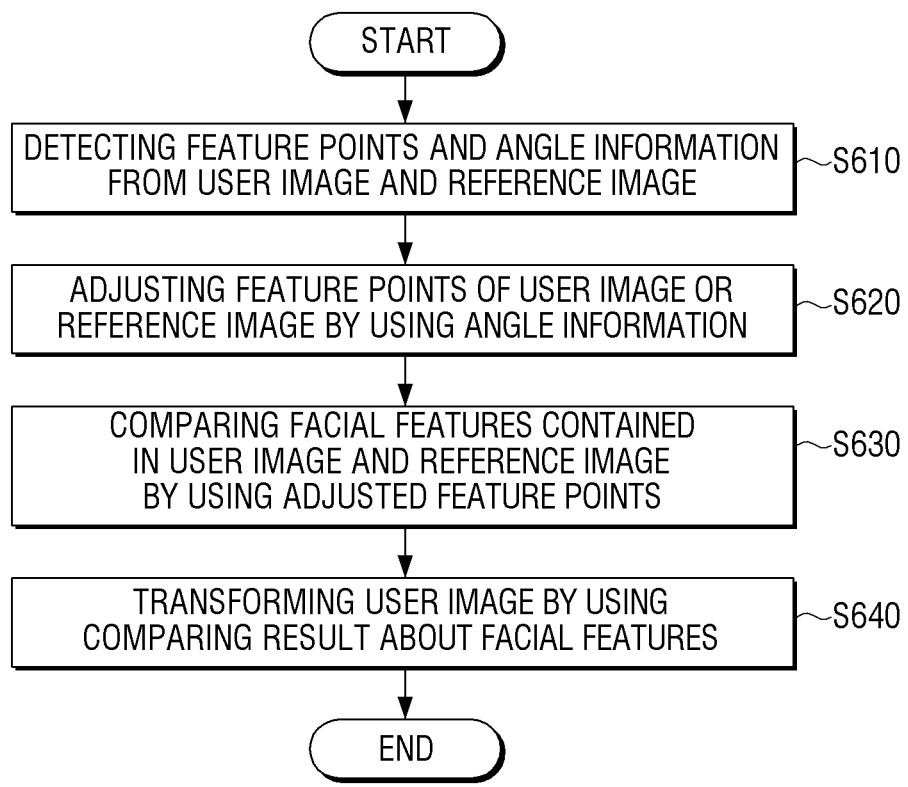
FIG. 6 is a flowchart for explaining an image transformation method according to an exemplary embodiment.

FIG. 6 is a flowchart for explaining an image transformation method according to an exemplary embodiment. Referring to FIG. 6, first, the image transformation apparatus 100 detects feature points and angle information from the user image and the reference image (S610). Here, the user image and the reference image may be selected by the user's command. The images photographed by the photographing unit or stored in the storage may be used as the user image. On the other hand, after the user image is selected, the image transformation apparatus 100 may recommend at least one reference image based on the user information. The reference images may be recommended based on at least one of user's gender and age, user's schedule, user image analysis results, user's image transformation intentions, and user's current location. After that, a user's command to select at least one of the recommended reference images may be input. Then, the image transformation apparatus 100 may detect feature points of a face area and angle information of the face from the selected user image and reference image. Particularly, the image transformation apparatus 100 may pre-learn face patterns by using the active appearance model (AAM) technique, etc., and thus may automatically detect positions of the feature points. This was described in detail in above-description with reference to FIG. 2, and therefore, a detailed description thereof will be omitted.

After that, the image transformation apparatus 100 adjusts the feature points of the user image or the reference image by using the detected angle information. In detail, if the face angle of each of the user image and the reference image is different from each other, the feature points of the user image or the reference image may be adjusted to be matched with each other.

Then, the image transformation apparatus 100 compares facial features contained in the user image and the reference image by using the adjusted feature points (S630). The facial features may include at least one of an eye shape, a nose shape, a mouth shape, and a jaw-line shape. In detail, the image transformation apparatus 100 may compare relative distances between feature points contained in the user image and distances between the feature points contained in the reference image, and then calculate differences therebetween. Also, the ratio of the horizontal length and the vertical length may be compared with respect to the facial features such as entire face, eyes, nose, mouth, etc. A process of comparing the facial features was described in detail with reference to FIG. 3 and therefore, a detailed description thereof will be omitted.

Then, the image transformation apparatus 100 transforms the user image by using the comparing results about the facial features (S640). In detail, the image transformation apparatus 100 may transform the feature points of the user image, thereby transforming the user image.

The face transformation method according to various exemplary embodiments may be implemented as programs that can be executed in by a processor of a computer or a terminal device. Then, the programs may be stored in various types of recordable media.

In detail, codes to perform the above-described methods may be stored in various types of non-transitory recordable media, such as a flash memory, a read only memory (ROM), an erasable programmable ROM (EPROM), an electrically erasable and programmable ROM (EEPROM), a hard disc, a removable disc, a memory card, a Universal Serial Bus (USB) memory, a CD-ROM, etc.

According to various exemplary embodiments as described above, a user of an image transformation apparatus can easily perform image transformation without special knowledge for the image transformation.

While the exemplary embodiments have been described, additional variations and modifications of the exemplary embodiments may occur to those skilled in the art. Therefore, it is intended that the appended claims shall be construed to include both the above embodiments and all such variations and modifications that fall within the spirit and scope of the inventive concepts.

What is claimed is:

1. An image transformation apparatus comprising a processor, the processor comprising:
    a detection unit which is configured to detect, from each of a user image and a reference image, feature points of a face and an angle of the face;
    a feature points adjusting unit which is configured to adjust the feature points of the user image or the reference image based on the detected angle;
    a face analysis unit which is configured to compare facial features contained in the user image and the reference image based on the adjusted feature points; and
    an image transformation unit which is configured to transform the user image based on a result of the comparison of the facial features by the face analysis unit,
    wherein in response to the face angle in the user image being different from the face angle in the reference image, either the feature points of the reference image are adjusted so that the face angle of the reference image matches the detected face angle of the user image regardless of the face angle of the user image or the feature points of the user image are adjusted so that the face angle of the user image matches the detected face angle of the reference image regardless of the face angle of the reference image.

2. The image transformation apparatus of claim 1, wherein the feature points adjusting unit is further configured to adjust the feature points of the user image or the reference image so that a face angle of each of the user image and the reference image is matched with each other.

3. The image transformation apparatus of claim 1, wherein the face analysis unit is further configured to compare the facial features by calculating and comparing a difference in distances between the feature points of the user image and the feature points of the reference image, and the image transformation unit transforms the feature points of the user image based on the calculated difference in distances.

4. The image transformation apparatus of claim 1, wherein the facial features comprise at least one of an eye shape, a nose shape, a mouth shape, and a jaw-line shape.

5. The image transformation apparatus of claim 1, wherein the processor further comprises an image recommendation unit which is configured to recommend at least one reference image based on user information; and
    the image transformation apparatus further comprises an input unit which is configured to receive a user's command to select at least one of the recommended reference images.

6. The image transformation apparatus of claim 5, wherein the user information includes at least one of a user's gender, age, schedule, image transformation intentions, and current location, and user image analysis results.

7. The image transformation apparatus of claim 1, wherein each of the user image and the reference image comprises a two-dimensional image.

8. An image transformation method comprising:
detecting, from each of a user image and a reference image, feature points of a face and a face angle;
adjusting the feature points of the user image or the reference image by using the detected face angle;
comparing facial features contained in the user image and the reference image by using the adjusted feature points;
transforming the user image by using a result of the comparing the facial features; and
adjusting, in response to the face angle in the user image being different from the face angle in the reference image, either the feature points of the reference image are adjusted so that the face angle of the reference image matches the detected face angle of the user image regardless of the face angle of the user image or the feature points of the user image are adjusted so that the face angle of the user image matches the detected face angle of the reference image regardless of the face angle of the reference image.

9. The image transformation method of claim 8, wherein the adjusting the feature points comprises adjusting the feature points of the user image or the reference image so that a face angle of each of the user image and the reference image is matched with each other.

10. The image transformation method of claim 8, wherein the comparing the facial features comprises calculating and comparing a difference in distances between the feature points of the user image and the feature points of the reference image, and
the transforming the user image comprises transforming the feature points of the user image based on the calculated difference of distances.

11. The image transformation method of claim 8, wherein the facial features comprises at least one of an eye shape, a nose shape, a mouth shape, and a jaw-line shape.

12. The image transformation method of claim 8, further comprising:
recommending at least one reference image based on user information; and
receiving a user's command to select at least one of the recommended reference images.

13. The image transformation method of claim 12, wherein the user information includes at least one of a user's gender, age, schedule, image transformation intentions, and current location, and user image analysis results.

14. The image transformation method of claim 8, wherein each of the user image and the reference image comprises a two-dimensional image.

15. The image transformation apparatus of claim 1, further comprising:
an image recommendation unit which is configured to recommend the reference image based on user information.

* * * * *